United States Patent
Puthalapat et al.

(10) Patent No.: US 8,929,231 B2
(45) Date of Patent: *Jan. 6, 2015

(54) CHANNEL PATH DISPLAY OF A VIDEO NETWORK

(75) Inventors: Govinda Puthalapat, Tampa, FL (US); Jie Qian, Center Valley, PA (US); Tim Hunniecutt, Brandon, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 725 days.

This patent is subject to a terminal disclaimer.

(21) Appl. No.: 13/185,187

(22) Filed: Jul. 18, 2011

(65) Prior Publication Data

US 2012/0023536 A1    Jan. 26, 2012

Related U.S. Application Data

(63) Continuation of application No. 11/860,968, filed on Sep. 25, 2007, now Pat. No. 8,000,255.

(51) Int. Cl.
| | |
|---|---|
| H04L 12/24 | (2006.01) |
| H04L 12/28 | (2006.01) |
| H04N 21/431 | (2011.01) |
| H04N 21/438 | (2011.01) |
| H04N 21/482 | (2011.01) |

(52) U.S. Cl.
CPC ........ *H04L 12/2852* (2013.01); *H04L 12/2861* (2013.01); *H04N 21/431* (2013.01); *H04N 21/4383* (2013.01); *H04N 21/482* (2013.01)
USPC ..................... 370/252; 370/437; 715/719

(58) Field of Classification Search
None
See application file for complete search history.

(56) References Cited

U.S. PATENT DOCUMENTS

| | | | |
|---|---|---|---|
| 6,111,882 A | 8/2000 | Yamamoto | |
| 6,987,734 B2 | 1/2006 | Hundemer | |
| 8,000,255 B2 * | 8/2011 | Puthalapat et al. | 370/252 |
| 2007/0058043 A1 | 3/2007 | Thukral | |
| 2008/0270644 A1 | 10/2008 | Rooney et al. | |
| 2009/0070827 A1 | 3/2009 | Barroso | |
| 2012/0304219 A1 * | 11/2012 | Olague et al. | 725/27 |

* cited by examiner

*Primary Examiner* — Hassan Phillips
*Assistant Examiner* — Duc Duong

(57) ABSTRACT

A device may receive selection of a channel provided by a video network, determine equipment, of the video network, associated with the selected channel, determine status information of the associated equipment, determine port level details of the associated equipment, combine the associated equipment, the status information, and the port level details into a path for the selected channel, and provide the selected channel path to a user.

20 Claims, 11 Drawing Sheets

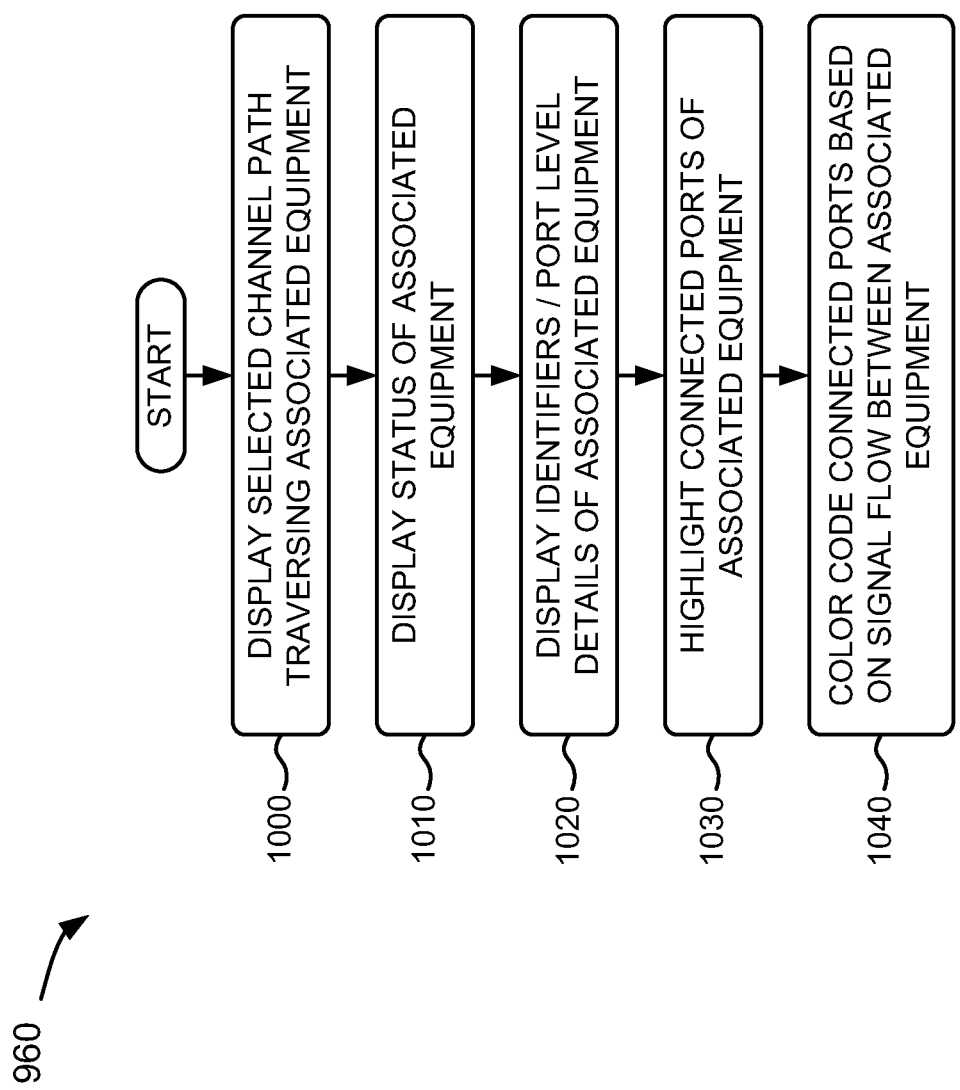

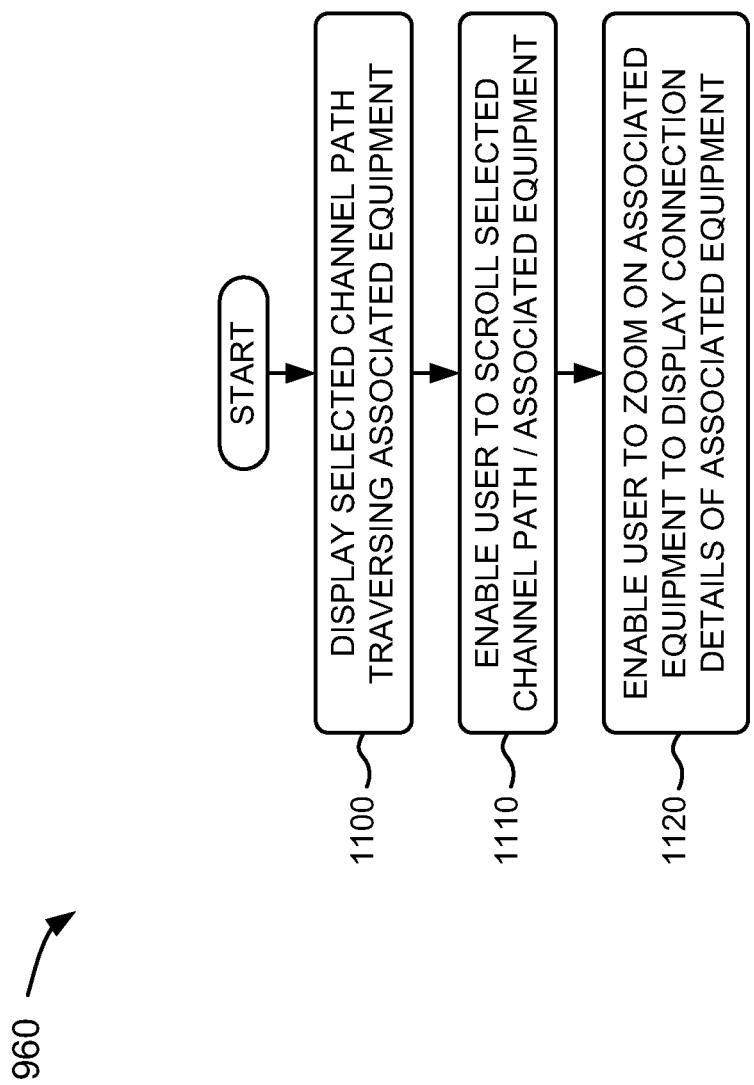

CHANNEL PATH DISPLAY OF A VIDEO NETWORK

RELATED APPLICATION

This application is a continuation of U.S. patent application Ser. No. 11/860,968, filed Sep. 25, 2007 now U.S. Pat. No. 8,000,255 the disclosure of which is incorporated by reference herein in its entirety.

BACKGROUND

A video (e.g., television) network may provide national programming content and local and/or metropolitan-area content. The national programming content may include multiple national channels, and/or the local content may include multiple local channels. Such channels may be transmitted via a variety of equipment and/or channel paths maintained by a video network service provider before they are provided to customers (e.g., via a passive optical network (PON)). A PON is a point-to-multipoint, fiber to premises network architecture in which optical splitters are used to enable a single optical fiber to serve multiple premises (e.g., customers). Managing such a video network and its associated equipment, channels, etc. is a difficult task.

BRIEF DESCRIPTION OF THE DRAWINGS

FIGS. 9-11 depict a flow chart of an exemplary process according to implementations described herein.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may include systems and/or methods that manage and/or display channel paths through equipment of a video network. For example, in one implementation, the systems and/or methods may receive a selected channel of the video network, and/or may determine equipment associated with the selected channel. The systems and/or methods may determine status information and/or port level details for the associated equipment, and/or may combine the information into a path for the selected channel. The systems and/or methods may display the information associated with the selected channel path. In other implementations, the systems and/or methods may enable a user to scroll through the selected channel path and/or its associated equipment, and/or may enable a user to zoom on the associated equipment for display of connection details.

Figure 1:
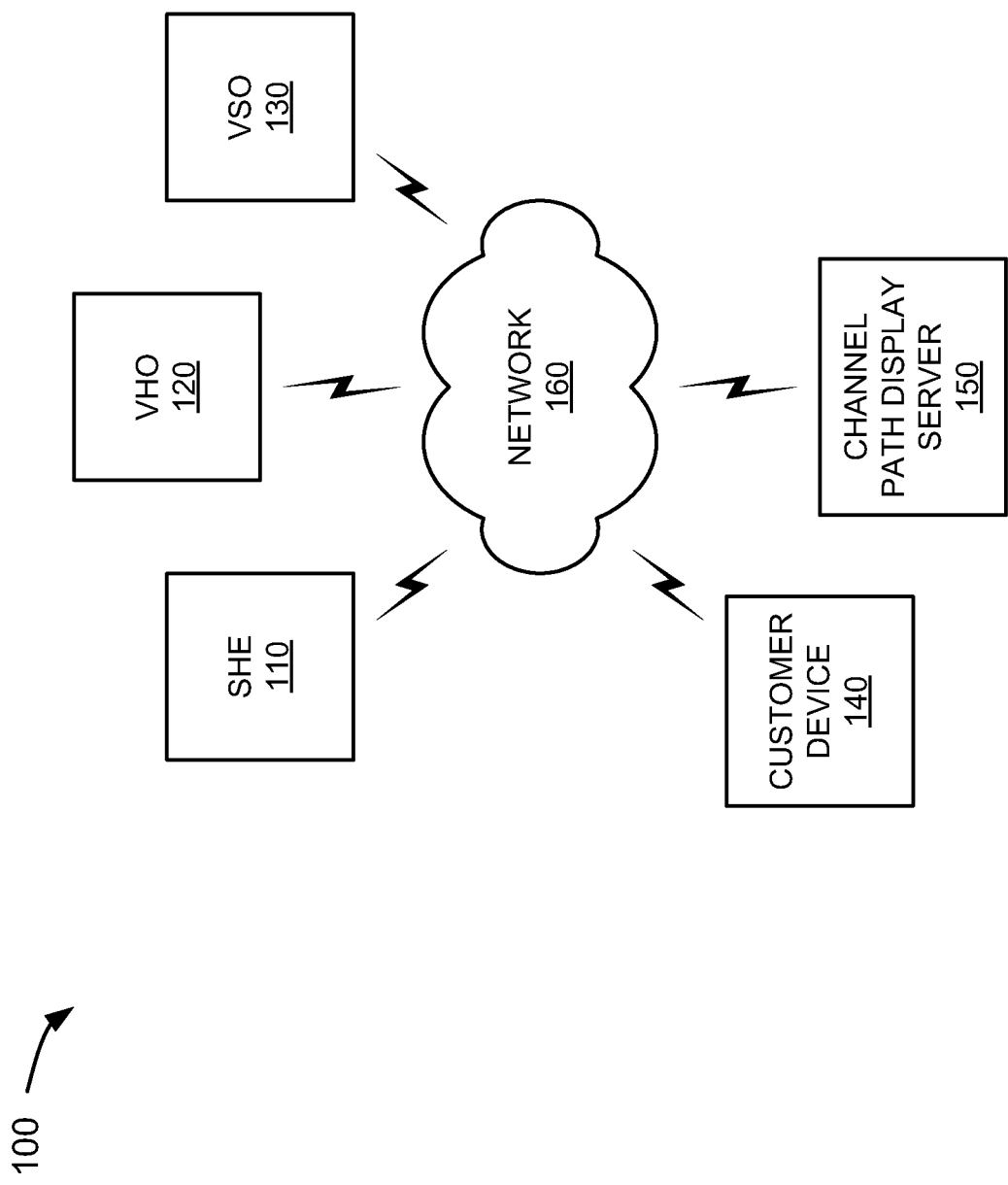
FIG. 1 is an exemplary diagram of a network in which systems and methods described herein may be implemented.

FIG. 1 is an exemplary diagram of a network 100 in which systems and methods described herein may be implemented.

As illustrated, network 100 may include a super head end (SHE) 110, a video hub office (VHO) 120, a video service office (VSO) 130, a customer device 140, and/or a channel path display server 150 interconnected by a network 160. SHE 110, VHO 120, VSO 130, customer device 140, and/or channel path display server 150 may connect to network 160 via wired and/or wireless connections. A single SHE, VHO, VSO, customer device, channel path display server, and network have been illustrated in FIG. 1 for simplicity. In practice, there may be more or less SHEs, VHOs, VSOs, customer devices, channel path display servers, and/or networks. Also, in some instances, one or more of SHE 110, VHO 120, VSO 130, and/or channel path display server 150 may perform one or more functions described as being performed by another one or more of SHE 110, VHO 120, VSO 130, and/or channel path display server 150.

SHE 110 may include one or more server entities that gather, process, search, and/or provide information in a manner described herein. In one implementation, SHE 110 may include one or more devices that receive video (e.g., television signals) for processing and distribution over a video network (e.g., a cable television system). For example, SHE 110 may include equipment for receiving and/or re-transmitting video over a video network. In other implementations, SHE 110 may serve as a single point to aggregate national programming content. SHE 110 may encode the national programming content (e.g., into moving picture experts group (MPEG) streams), and/or may transmit the content over a network (e.g., network 160) to VHO 120.

VHO 120 may include one or more server entities that gather, process, search, and/or provide information in a manner described herein. In one implementation, VHO 120 may include one or more devices that collect local or metropolitan-area content, and/or combine the local content with national programming content received from SHE 110. In other implementations, VHO 120 may create an interactive program guide (IPG) for the national and local content that may be used by customers. In still other implementations, VHO 120 may convert video traffic (e.g., the national and local content) into video data signals (e.g., optical video data signals), and/or may transmit the video data signals over a network (e.g., network 160) to VSO 130.

VSO 130 may include one or more server entities that gather, process, search, and/or provide information in a manner described herein. In one implementation, VSO 130 may include one or more devices that receive the video data signals (e.g., the national and local content) from VHO 120, and/or receive data signals (e.g., high-speed Internet services), and/or voice signals (e.g., telephone services). In other implementations, VSO 130 may combine the video, data, and/or voice signals, and/or may transmit the combined signal (e.g., over a PON) to customers.

Customer device 140 may include any device capable of receiving video, data, and/or voice signals from VHO 130 (e.g., via network 160). For example, customer device 140 may include one or more of a private branch exchange (PBX), a set top box and a corresponding television monitor, a router and one or more corresponding computers, a telephone, etc. A PBX may include a private telephone network that may be used within an organization. Customers of a PBX may share a number of outside lines for making telephone calls external to the PBX. A set top box may include a device that may connect to a communication channel (e.g., a cable television line) and may produce output on a television monitor. A router may include a device that forwards information to one or more computers. A computer may include a computing device, such as a personal computer, a personal digital assistant (PDA), a laptop, or other types of computation or communication devices, threads or processes running on these devices, and/or objects executable by these devices. A telephone may include one or more types of telephone devices that are capable of providing telephony services (e.g., to the customer).

Channel path display server 150 may include one or more server entities that gather, process, search, and/or provide information in a manner described herein. In one implementation, channel path display server 150 may receive a selection of a channel of a video network (e.g., network 100), and/or may determine equipment associated with the selected channel. The associated equipment may be included within SHE 110, VHO 120, VSO 130, and/or network 160. Channel path display server 150 may determine status information and port level details for the associated equipment, and/or may combine the information into a path for the selected channel. Channel path display server 150 may display the information associated with the selected channel path. In other implementations, channel path display server 150 may enable a user (e.g., a network administrator) to scroll through the selected channel path and/or its associated equipment, and/or may enable a user to zoom on the associated equipment for display of connection details. In still other implementations, channel path display server 150 may include the features set forth in co-pending application Ser. No. 11/860,995, entitled "SEARCHING CHANNEL PATH DISPLAY OF A VIDEO NETWORK," filed on the same date herewith, the disclosure of which is incorporated by reference herein in its entirety. Further details of channel path display server 150 are provided below in connection with FIGS. 3 and 4.

Network 160 may include a local area network (LAN), a wide area network (WAN), a metropolitan area network (MAN), an intranet, the Internet, a Public Land Mobile Network (PLMN), a telephone network, such as the Public Switched Telephone Network (PSTN) or a cellular telephone network, or a combination of networks that provide data, voice, and/or television services to the customer.

Although FIG. 1 shows exemplary components of network 100, in other implementations, network 100 may contain fewer, different, or additional components than depicted in FIG. 1. For example, network 100 may include one or more content servers that provide television programming, video content (e.g., movies, on-demand services, live television, etc.), etc. to customer device 140 (e.g., a set top box and a television monitor, one or more video encoders, etc.). In still other implementations, one or more components of network 100 may perform one or more other tasks described as being performed by one or more other components of network 100.

Figure 2:
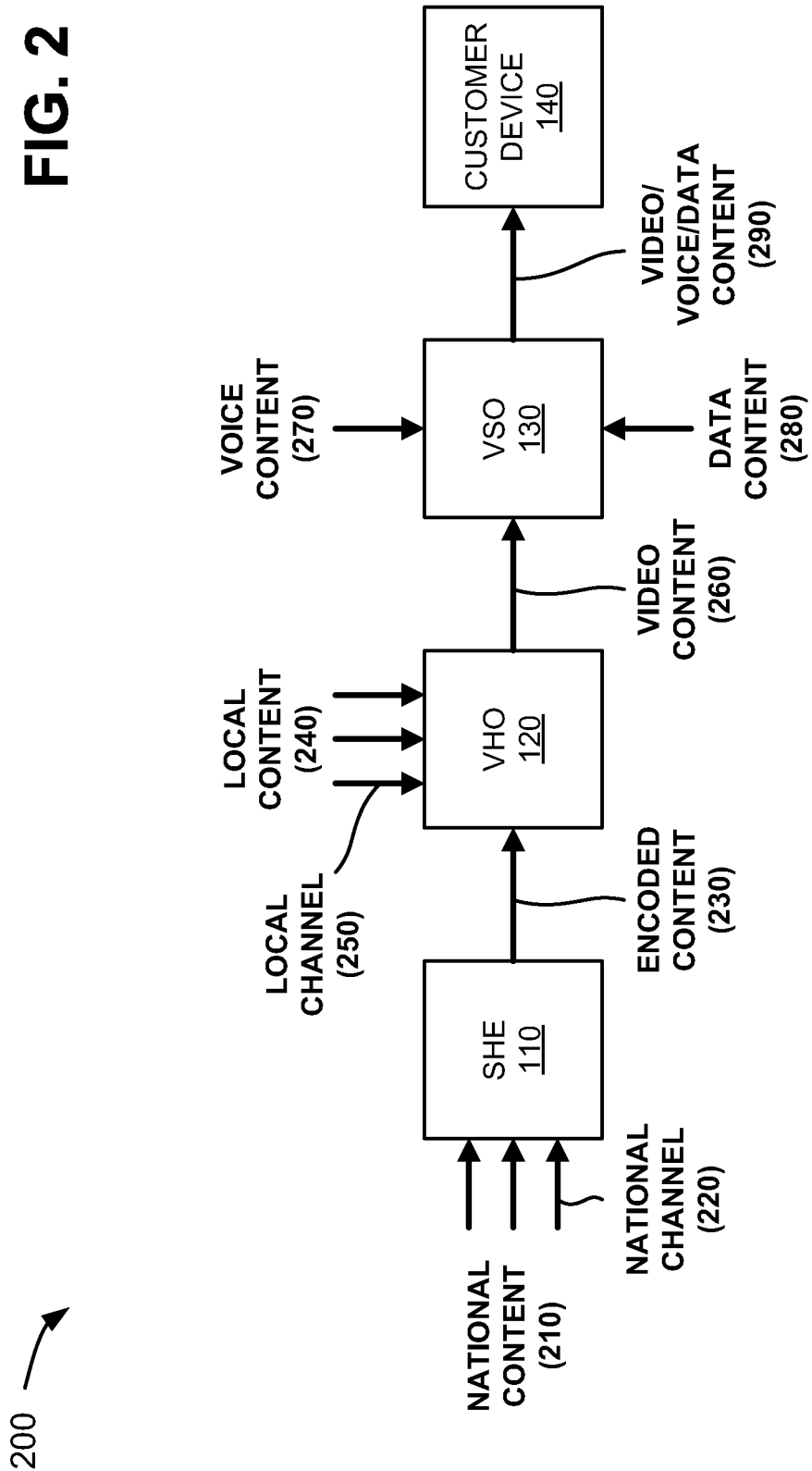
FIG. 2 illustrates exemplary operation of a portion of the network depicted in FIG. 1.

FIG. 2 depicts exemplary operation of a portion 200 of network 100. As illustrated, network portion 200 may include SHE 110, VHO 120, VSO 130, and/or customer device 140. SHE 110, VHO 120, VSO 130, and/or customer device 140 may include the features described above in connection with FIG. 1. SHE 110 may receive national programming content 210 that includes one or more national channels 220 (e.g., ABC, NBC, CBS, etc.). SHE 110 may encode national programming content 210 into encoded content 230 (e.g., MPEG streams), and/or may transmit encoded content 230 to VHO 120 (e.g., via network 160). VHO 120 may receive encoded content 230 and local content 240 that includes one or more local channels 250. VHO 120 may combine encoded content 230 and local content 240, may convert the combined content into video content 260 (e.g., optical video data signals), and/or may transmit video content 260 to VSO 130 (e.g., via network 160).

As further shown in FIG. 2, VSO 130 may receive video content 260, voice content 270 (e.g., telephony services), and/or data content 280 (e.g., Internet traffic). VSO 130 may combine video content 260, voice content 270, and data content 280 into video/voice/data content 290, and may transmit video/voice/data content 290 to customer device 140. In one implementation, VSO 130 may transmit video/voice/data content 290 as an optical signal, via a PON, to customer device 140. In one implementation, customer device 140 may receive video/voice/data content 290, and may convert a video portion of content 290 into an electrical signal (e.g., which may be used by cable-ready televisions and/or set top boxes via coaxial cables).

Although FIG. 2 shows exemplary components of network portion 200, in other implementations, network portion 200 may contain fewer, different, or additional components than depicted in FIG. 2. In still other implementations, one or more components of network portion 200 may perform one or more other tasks described as being performed by one or more other components of network portion 200.

Figure 3:
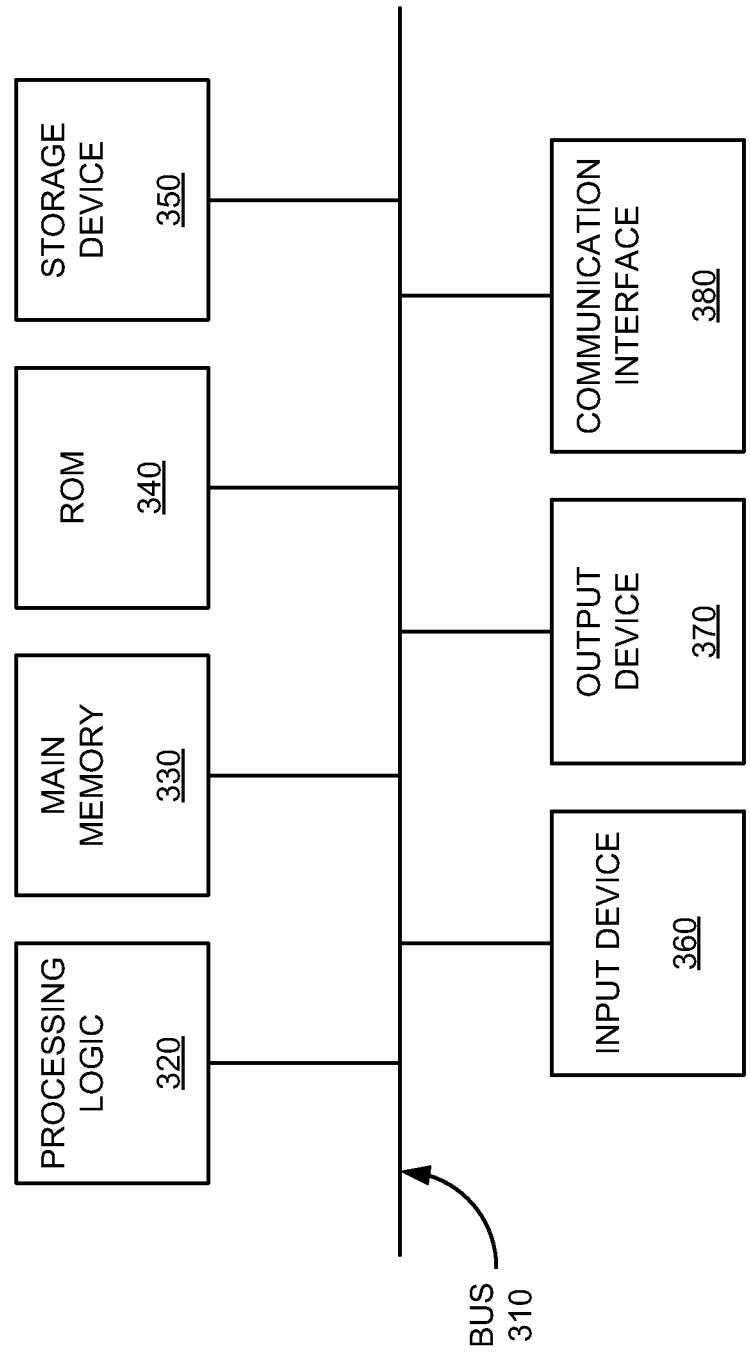
FIG. 3 illustrates exemplary components of a channel path display server of the network depicted in FIG. 1.

FIG. 3 is an exemplary diagram of channel path display server 150. As illustrated, channel path display server 150 may include a bus 310, processing logic 320, a main memory 330, a read-only memory (ROM) 340, a storage device 350, an input device 360, an output device 370, and/or a communication interface 380. Bus 310 may include a path that permits communication among the components of channel path display server 150.

Processing logic 320 may include a processor, microprocessor, or other type of processing logic that may interpret and execute instructions. Main memory 330 may include a random access memory (RAM) or another type of dynamic storage device that may store information and instructions for execution by processing logic 320. ROM 340 may include a ROM device or another type of static storage device that may store static information and/or instructions for use by processing logic 320. Storage device 350 may include a magnetic and/or optical recording medium and its corresponding drive.

Input device 360 may include a mechanism that permits an operator to input information to channel path display server 150, such as a keyboard, a mouse, a pen, a microphone, voice recognition and/or biometric mechanisms, etc. Output device 370 may include a mechanism that outputs information to the operator, including a display, a printer, a speaker, etc. Communication interface 380 may include any transceiver-like mechanism that enables channel path display server 150 to communicate with other devices and/or systems. For example, communication interface 380 may include mechanisms for communicating with another device or system via a network, such as network 160.

As described herein, channel path display server 150 may perform certain operations in response to processing logic 320 executing software instructions contained in a computer-readable medium, such as main memory 330. A computer-readable medium may be defined as a physical or logical memory device and/or carrier wave. The software instructions may be read into main memory 330 from another computer-readable medium, such as storage device 350, or from another device via communication interface 380. The software instructions contained in main memory 330 may cause processing logic 320 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 shows exemplary components of channel path display server 150, in other implementations, channel path display server 150 may contain fewer, different, or additional components than depicted in FIG. 3. In still other implementations, one or more components of channel path display server 150 may perform one or more other tasks described as being performed by one or more other components of channel path display server 150.

Figure 4:
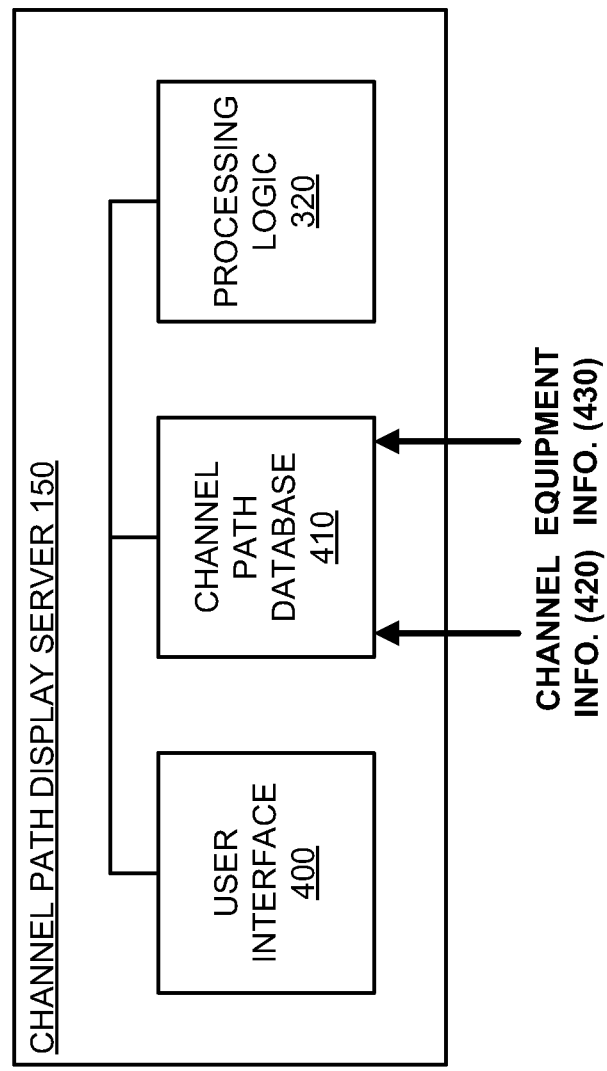
FIG. 4 depicts other exemplary components of the channel path display server of the network illustrated in FIG. 1.

FIG. 4 depicts other exemplary components of channel path display server 150. As illustrated, channel path display server 150 may include a user interface 400 and a channel path database 410 in addition to processing logic 320. In one implementation, processing logic 320 may cooperate with channel path database 410 to display channel path information via user interface 400.

User interface 400 may include a graphical user interface (GUI) or a non-graphical user interface, such as a text-based interface. User interface 400 may provide information to users (e.g., network administrators) via a customized interface (e.g., a proprietary interface) and/or other types of interfaces (e.g., a browser-based interface). User interface 400 may receive user inputs via one or more input devices (e.g., input device 360), may be user configurable (e.g., a user may change the size of user interface 400, information displayed in user interface 400, color schemes used by user interface 400, positions of text, images, icons, windows, etc., in user interface 400, etc.), and/or may not be user configurable. User interface 400 may be displayed to a user via one or more output devices (e.g., output device 370).

Database 410 may be provided in channel path display server 150 (e.g., within storage device 350) and/or may be managed by channel path display server 150 (e.g., in which case, database 410 may be located external to channel path display server 150). Database 410 may include a variety of information related to equipment, channels, etc. provided by SHE 110, VHO 120, VSO 130, customer device 140, and/or network 160. As shown in FIG. 4, database 410 may receive channel information 420 and/or equipment information 430 from SHE 110, VHO 120, VSO 130, customer device 140, and/or network 160. Channel information 420 may include any information related to any channel provided by network 100. Equipment information 430 may include any information related to any equipment associated with channel information 420. For example, equipment information 430 may include information related to equipment in network 100 that may be used to create a path(s) for one or more channels.

In one implementation, user interface 400 may receive selection (e.g., from a network administrator) of a channel provided by network 100, and processing logic 320 may query database 410 to determine equipment in network 100 that may be associated with the selected channel (e.g., used to create a path for the selected channel). Processing logic 320 may query database 410 to determine status information (e.g., operational, offline, problem, etc.) and/or port level details (e.g., which input and/or output ports are used for the selected channel path) of the associated equipment. Processing logic 320 may combine such information (e.g., associated equipment, status information, port level details, etc.) into a path for the selected channel, and/or may provide the combined information to user interface 400 for display.

Although FIG. 4 shows exemplary components of channel path display server 150, in other implementations, channel path display server 150 may contain fewer, different, or additional components than depicted in FIG. 4. In still other implementations, one or more components of channel path display server 150 may perform one or more other tasks described as being performed by one or more other components of channel path display server 150.

Figure 5:
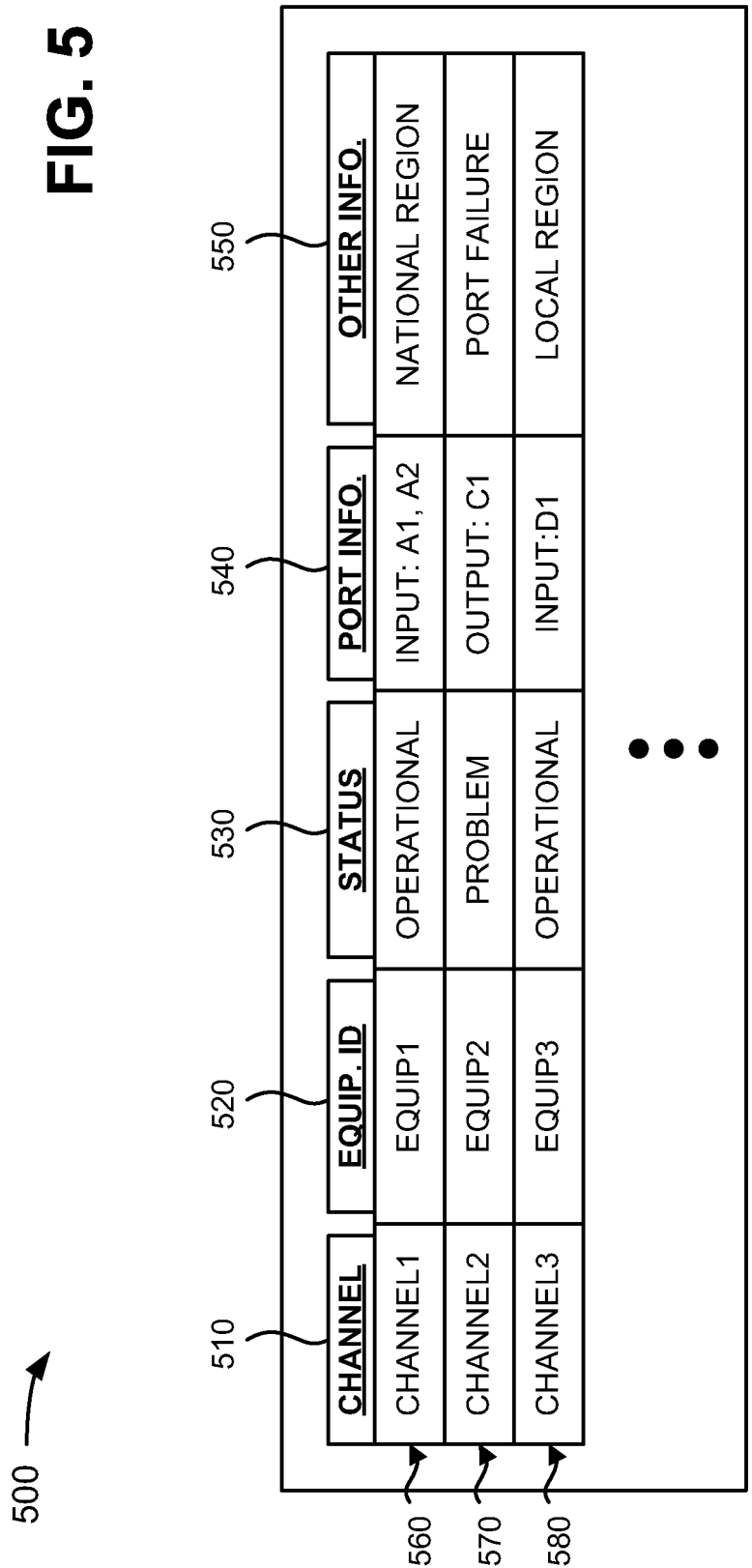
FIG. 5 illustrates a portion of a database that may be associated with the channel path display server depicted in FIG. 4.

FIG. 5 illustrates a portion 500 of database 410 capable of being provided in channel path display server 150 (e.g., within storage device 350) and/or managed by channel path display server 150. The information provided in database portion 500 may be provided by any device in network 100 (e.g., by SHE 110, VHO 120, VSO 130, customer device 140, and/or devices provided in network 160). For example, as described above in connection with FIG. 4, database 410 may receive channel information 420 and/or equipment information 430 from SHE 110, VHO 120, VSO 130, customer device 140, and/or network 160.

As illustrated, database portion 500 may include a variety of channel path information, such as a channel category 510, an equipment identification (ID) category 520, an equipment status category 530, a port information category 540, and other information category 550. Each category of database portion 500 may include multiple channel path information-associated records. For example, as shown in FIG. 5, database portion 500 may include a first record 560, a second record 570, and third record 580. Although database portion 500 depicts three records, in other implementations, database portion 500 may include fewer, more, or different records than depicted in FIG. 5. Furthermore, database portion 500 may include fewer, different, or additional categories than depicted in FIG. 5.

Channel category 510 may include the names of channels provided by network 100. For example, first record 560 may include the name "CHANNEL1" (e.g., "NBC") under channel category 510, second record 570 may include the name "CHANNEL2" under channel category 510, and third record 580 may include the name "CHANNEL3" under channel category 510. Equipment ID category 520 may include identification of one or more pieces of equipment (e.g., in network 100) associated with the channel provided in channel category 510. For example, first record 560 may include the equipment identification "EQUIP1" under equipment ID category 520.

Equipment status category 530 may include the status of equipment associated with each equipment ID provided in equipment ID category 520. For example, first record 560 may include the equipment status "OPERATIONAL" under equipment status category 530, second record 570 may include the equipment status "PROBLEM" under equipment status category 530, and third record 580 may include the equipment status "OPERATIONAL" under equipment status category 530. Port information category 540 may include any port information (e.g., input ports and output ports for each piece of equipment along the path with the originating equipment having output ports and the destination equipment having input ports) associated with each equipment ID provided in equipment ID category 520. For example, first record 560 may include port information "INPUT: A1, A2" under port information category 540.

Other information category 550 may include other information associated with the information provided in channel category 510, equipment ID category 520, equipment status category 530, and/or port information category 540. For example, first record 560 may include other information "NATIONAL REGION" (e.g., indicating that CHANNEL1 is from a national region) under other information category 550, second record 570 may include other information "PORT FAILURE" (e.g., indicating a port failure in EQUIP2) under other information category 550, and third record 580 may include other information "LOCAL REGION" (e.g., indicating that CHANNEL3 is from a local region) under other information category 550.

Although FIG. 5 shows exemplary information that may be provided in database portion 500, in other implementations, database portion 500 may contain fewer, different, or additional information than depicted in FIG. 5.

Figure 6:
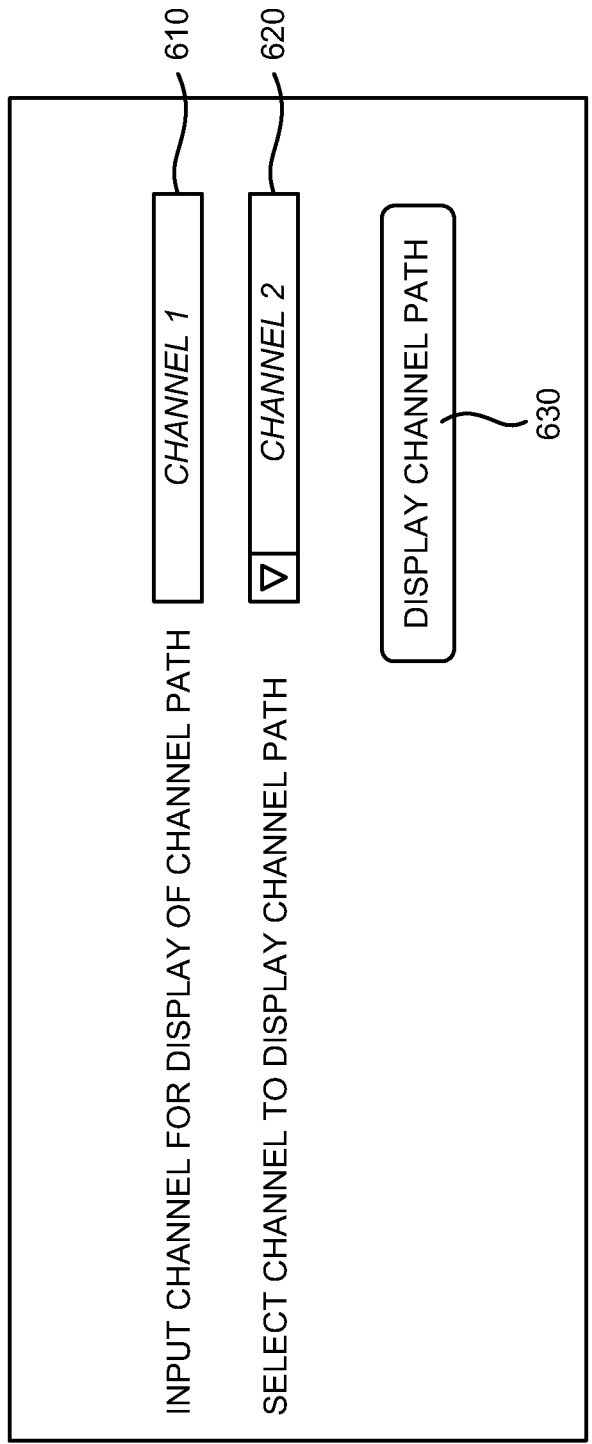
FIGS. 6-8 illustrate exemplary user interfaces associated with the channel path display server depicted in FIG. 1.
Figure 7:
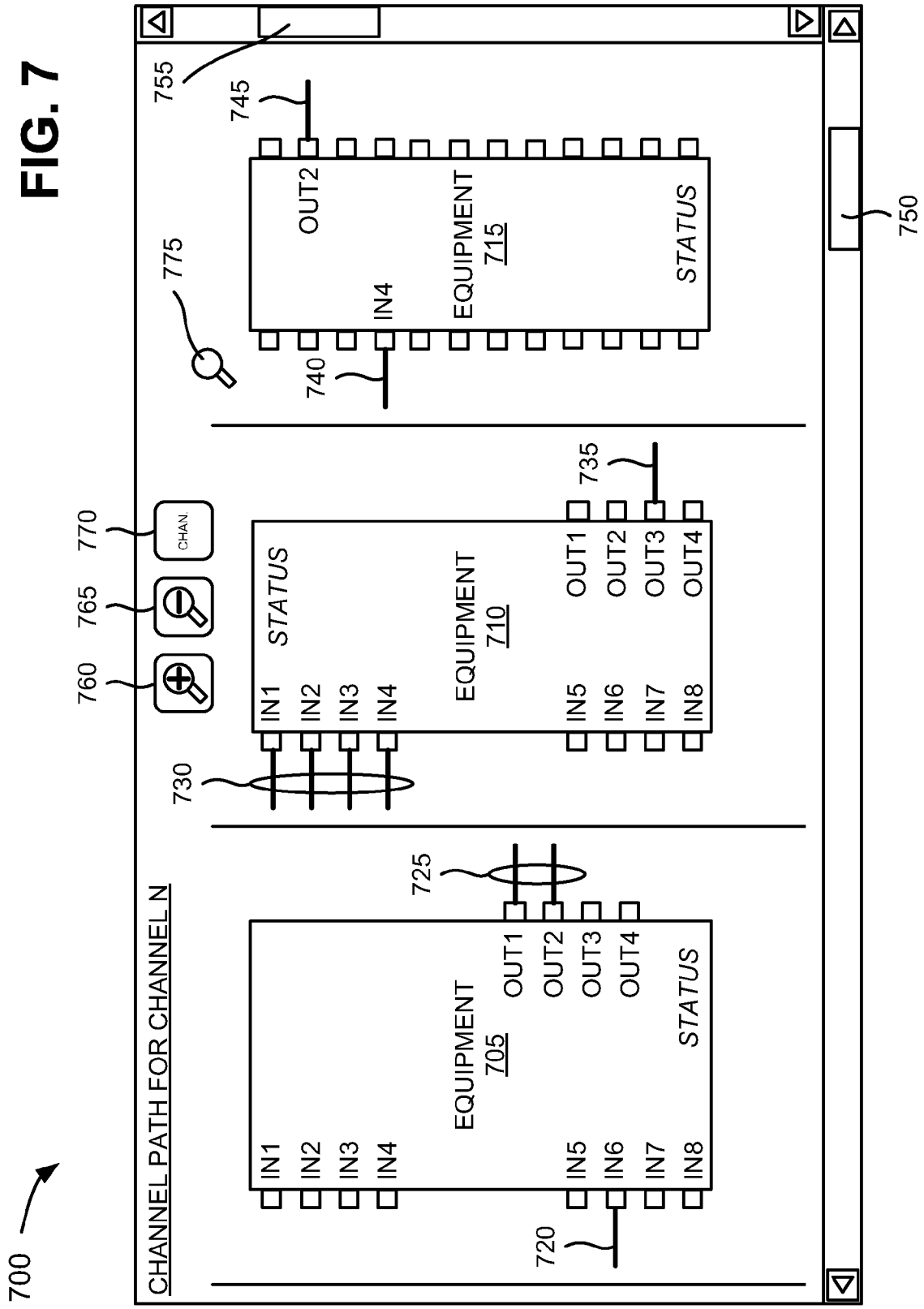
Figure 8:
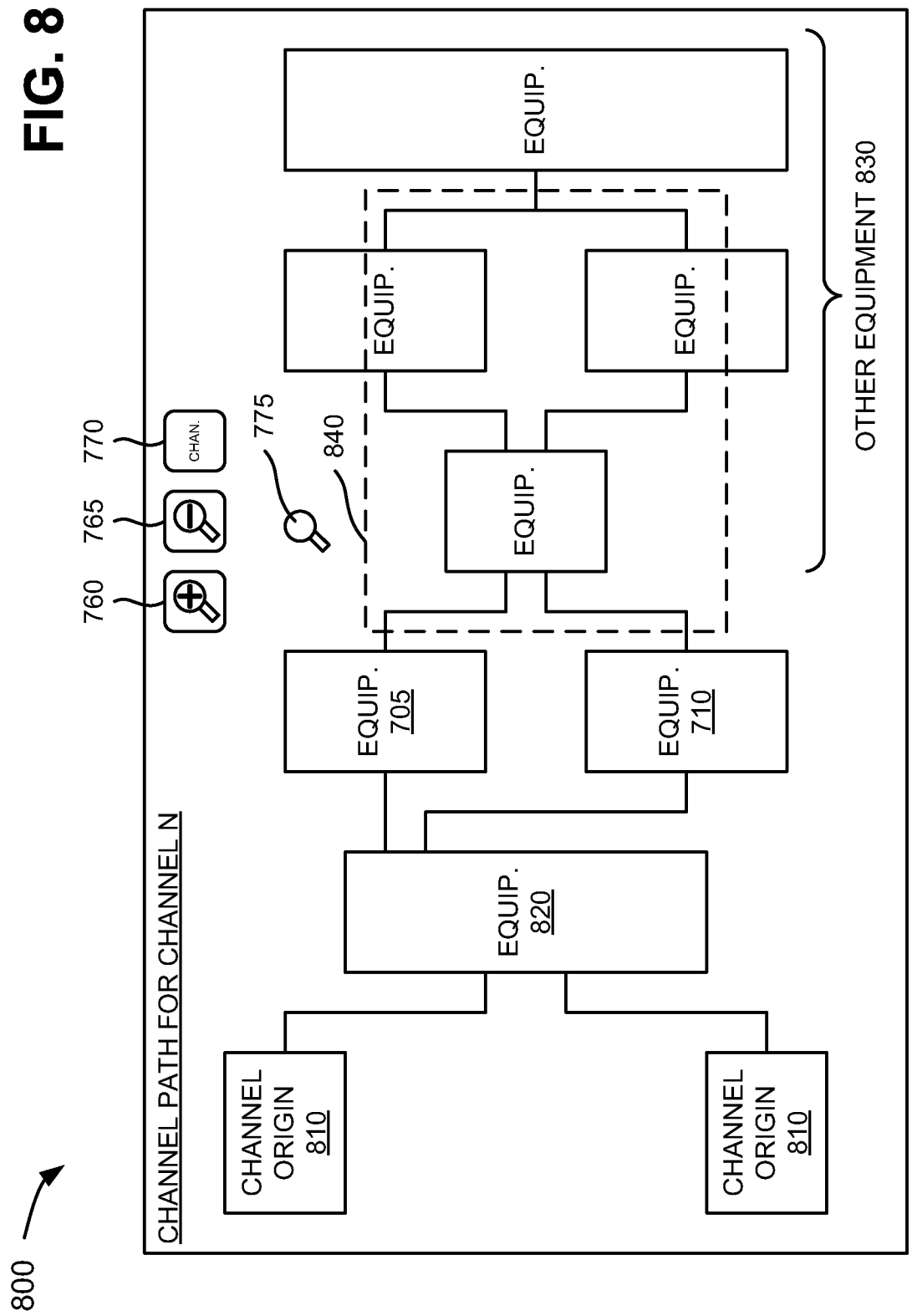

FIGS. 6-8 depict exemplary user interfaces 600-800 that may be provided by channel path display server 150 (e.g., via user interface 400). As illustrated in FIG. 6, user interface 600 may enable a user to input and/or select a channel (e.g., a channel provided by network 100) for display of its path. In one implementation, user interface 600 may include an input channel field 610, a select channel field 620, and/or a display channel path button 630. Input channel field 610 may request that the user input a channel for display of its path. For example, as shown in FIG. 6, a user may input "CHANNEL 1" into input channel field 610. Select channel field 620 may enable a user to select (e.g., via a drop-down menu, a list, etc.) a channel for display of its path. For example, as shown in FIG. 6, a user may select "CHANNEL 2" with select channel field 620. If a user inputs a channel (e.g., via input channel field 610) or selects a channel (e.g., via select channel field 620), the user may select display channel path button 630 in order to display the selected channel path and/or any equipment associated with the selected channel path. In other implementations, a user may input/select a channel via other similar input mechanisms (e.g., via links).

If a user selects channel path display button 630, user interface 700, as shown in FIG. 7, may be displayed to the user. As illustrated, user interface 700 may include a variety of information associated with the channel path selected by the user. In one implementation, user interface 700 may display an entire channel path of the selected channel, one or more portions of the channel path, etc. User interface 700 may display equipment (e.g., a representation of equipment) associated with the selected channel path. For example, user interface 700 may display equipment 705, equipment 710, and/or equipment 715, which may represent a portion of the equipment associated with the selected channel path.

Equipment 705 may include any device provided by network 100 that may communicate the selected channel through network 100. For example, equipment 705 may include a gateway, a router, a switch, a firewall, a bridge, a multiplexer, a splitter, and/or some other type of device that transmits and/or receives the selected channel as part of conveying the selected channel to customer device 140. In one implementation, user interface 700 may display status information, identification information, port level details, etc. of equipment 705. In other implementations, user interface 700 may display input ports (e.g., "IN1, . . . , IN8") and/or output ports (e.g., "OUT1, . . . , OUT4") associated with equipment 705. Ports of equipment 705 that provide the selected channel may be highlighted, and/or ports that do not provide the selected channel may not be highlighted. For example, the selected channel provided by user interface 700 may enter equipment 705 via an input port 720 (e.g., "IN6"), and may exit equipment 705 via output ports 725 (e.g., "OUT1" and "OUT2"). The ports providing the selected channel (e.g., input port 720 and output ports 725) may provide an indication (e.g., via color coding or some other similar mechanism) of how a signal(s) is flowing through equipment 705 (e.g., strength of the signal, etc.).

Equipment 710 may include any device provided by network 100 that may communicate the selected channel through network 100. For example, equipment 710 may include a gateway, a router, a switch, a firewall, a bridge, a multiplexer, a splitter, and/or some other type of device that transmits and/or receives the selected channel as part of conveying the selected channel to customer device 140. In one implementation, user interface 700 may display status information, identification information, port level details, etc. of equipment 710. In other implementations, user interface 700 may display input ports (e.g., "IN1, . . . , IN8") and/or output ports (e.g., "OUT1, . . . , OUT4") associated with equipment 710. Ports of equipment 710 that provide the selected channel may be highlighted, and/or ports that do not provided the selected channel may not be highlighted. For example, the selected channel provided by user interface 700 may enter equipment 710 via input ports 730 (e.g., "IN1, . . . , IN4"), and may exit equipment 710 via an output port 735 (e.g., "OUT3"). The ports providing the selected channel (e.g., input ports 730 and output port 735) may provide an indication (e.g., via color coding or some other similar mechanism) of how a signal(s) is flowing through equipment 710.

Equipment 715 may include any device provided by network 100 that may communicate the selected channel through network 100. For example, equipment 715 may include a gateway, a router, a switch, a firewall, a bridge, a multiplexer, a splitter, and/or some other type of device that transmits and/or receives the selected channel as part of conveying the selected channel to customer device 140. In one implementation, user interface 700 may display status information, identification information, port level details, etc. of equipment 715. In other implementations, user interface 700 may display input ports (e.g., "IN4") and/or output ports (e.g., "OUT2") associated with equipment 715. Ports of equipment 715 that provide the selected channel may be highlighted, and/or ports that do not provided the selected channel may not be highlighted. For example, the selected channel provided by user interface 700 may enter equipment 715 via an input port 720 (e.g., "IN4"), and may exit equipment 715 via an output port 745 (e.g., "OUT2"). The ports providing the selected channel (e.g., input port 740 and output port 745) may provide an indication (e.g., via color coding or some other similar mechanism) of how a signal(s) is flowing through equipment 715.

As further shown in FIG. 7, user interface 700 may display a variety of mechanisms to enable a user to manipulate the selected channel path displayed by user interface 700. For example, user interface 700 may include a left/right scrolling mechanism 750, an up/down scrolling mechanism 755, a zoom in button 760, a zoom out button 765, a channel selector button 770, and/or a zoom selector mechanism 775.

Left/right scrolling mechanism 750 may include a mechanism (e.g., a scroll bar) that enables a user to scroll left and/or right through the channel path displayed by user interface 700. Up/down scrolling mechanism 755 may include a mechanism (e.g., a scroll bar) that enables a user to scroll up and down through the channel path displayed by user interface 700.

If selected by a user (e.g., via a mouse or similar selection mechanism), zoom in button 760 may enable the user to zoom in on the channel path (or a portion of the channel path) displayed by user interface 700 (e.g., via zoom selector mechanism 775), as described below in connection with FIG. 8. If selected by a user, zoom out button 765 may enable the user to zoom out from the channel path (or a portion of the channel path) displayed by user interface 700. If selected by a user, channel selector button 770 may enable the user to select another channel by displaying user interface 600 to the user (e.g., for input of another channel). Zoom selector mechanism 775 may include a mechanism that enables a user to highlight the channel path (or a portion of the channel path) displayed by user interface 700.

If a user selects channel path display button 630 (FIG. 6), user interface 800, as shown in FIG. 8, may be displayed to the user. As illustrated, user interface 800 may include a variety of information associated with the channel path selected by the user, and/or may provide a view of the entire path associated with the selected channel. In one implementation, user interface 800 may display equipment 705, equipment 710, one or more channel origins 810, equipment 820, and/or other equipment 830.

Equipment 705 and equipment 710 may include some or all of the features described above in connection with FIG. 7. Channel origins 810 may include one or more devices (e.g., a satellite, etc.) that generate the selected channel. Equipment 820 and other equipment 830 may include any devices provided by network 100 that may communicate the selected channel through network 100. For example, each of equipment 820 and other equipment 830 may include a gateway, a router, a switch, a firewall, a bridge, a multiplexer, a splitter, and/or some other type of device capable of transmitting and/or receiving the selected channel.

As further shown in FIG. 8, if the selected channel path is large, it may be difficult to view detail information (e.g., connection details, status, port level details, etc.) associated with the displayed equipment (e.g., equipment 705, equipment 710, etc.). A user may select zoom in button 760, and may use zoom selector mechanism 775 to highlight one or more portions (e.g., as indicated by a dashed box 840) of the selected channel path displayed by user interface 800. The highlighted one or more portions may be displayed (e.g., by channel path display server 150) in an enlarged view so that detail information may be displayed.

Although FIGS. 6-8 show exemplary components of user interfaces 600-800, in other implementations, user interfaces 600-800 may contain fewer, different, or additional components than depicted in FIGS. 6-8. In still other implementations, one or more components of user interfaces 600-800 may perform one or more other tasks described as being performed by one or more other components of user interfaces 600-800.

Figure 9:
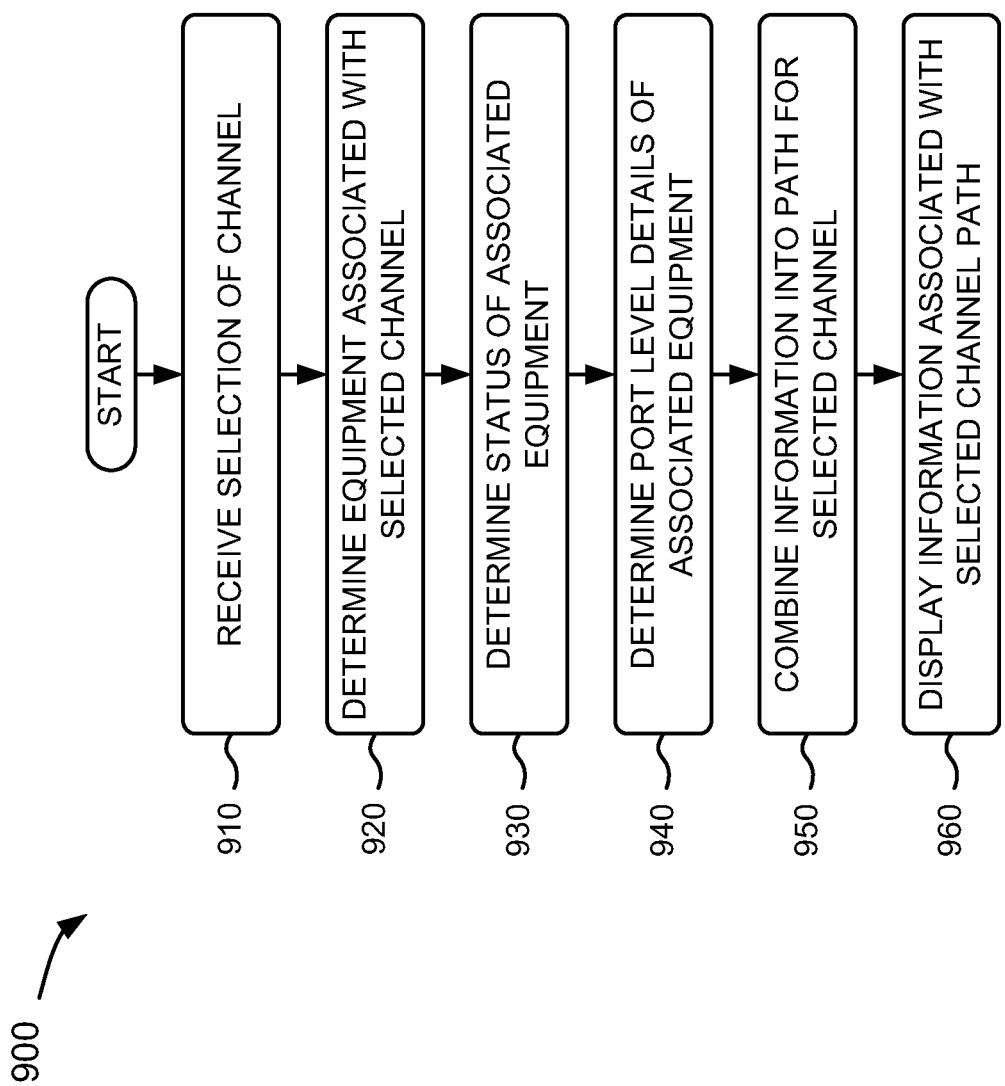

FIG. 9 depicts a flow chart of an exemplary process 900 for displaying information associated with a selected channel path according to implementations described herein. In one implementation, process 900 may be performed by channel path display server 150. In another implementation, some or all of process 900 may be performed by another device or group of devices, including or excluding channel path display server 150. Process 900 may begin with a user accessing channel path display server. Selection of a channel of a video network may be received (block 910), and/or equipment associated with the selected channel may be determined (block 920). For example, in one implementation described above in connection with FIG. 4, user interface 400 of channel path display server 150 may receive selection (e.g., from a user) of a channel provided by network 100, and processing logic 320 may query database 410 to determine equipment in network 100 that may be associated with the selected channel (e.g., used to create a path for the selected channel).

As further shown in FIG. 9, status information of the equipment associated with the selected channel may be determined (block 930), and/or port level details of the associated equipment may be determined (block 940). For example, in one implementation described above in connection with FIG. 4, processing logic 320 may query database 410 to determine status information (e.g., operational, offline, problem, etc.) and/or port level details (e.g., which input and/or output ports are used for the selected channel path) of the associated equipment.

Returning to FIG. 9, the associated equipment information, the status information, and the port level details may be combined into a path for the selected channel (block 950), and/or information associated with the selected channel path may be displayed (block 960). For example, in one implementation described above in connection with FIG. 4, processing logic 320 may combine such information (e.g., associated equipment, status information, port level details, etc.) into a path for the selected channel, and/or may provide the combined information to user interface 400 for display.

FIG. 10 depicts exemplary blocks that may be associated with block 960 of process 900. As illustrated, block 960 may include displaying the selected channel path traversing the associated equipment (block 1000), and/or displaying the status information of the associated equipment (block 1010). For example, in one implementation described above in connection with FIG. 7, if a user selects a channel, channel path display server 150 may display user interface 700, which may include a variety of information associated with the channel path selected by the user. User interface 700 may display an entire channel path of the selected channel, one or more portions of the channel path, etc. User interface 700 may display equipment (e.g., a representation of equipment) associated with the selected channel path. In another implementation, user interface 700 may display status information of equipment (e.g., equipment 705) associated with the selected channel path.

As further shown in FIG. 10, identifiers and/or port level details of the associated equipment may be displayed (block 1020), connected ports of the associated equipment may be highlighted (block 1030), and/or the connected ports may be color coded based on a signal flow between the associated equipment (block 1040). For example, in one implementation described above in connection with FIG. 7, user interface 700 may display identification information, port level details, etc. of equipment 705. In another implementation, user interface 700 may display input ports (e.g., "IN1, . . . , IN8") and/or output ports (e.g., "OUT1, . . . , OUT4") associated with equipment 705, where ports of equipment 705 that provide the selected channel may be highlighted. In other implementations, the ports providing the selected channel (e.g., input port 720 and output ports 725) may provide an indication (e.g., via color coding or some other similar mechanism) of how a signal(s) is flowing through equipment 705 (e.g., strength of the signal, etc.).

FIG. 11 depicts exemplary blocks that may be associated with block 960 of process 900. As illustrated, block 960 may include displaying the selected channel path traversing the associated equipment (block 1100), and/or enabling the user scroll through the selected channel path and/or the associated equipment (block 1110). For example, in one implementation described above in connection with FIG. 7, if a user selects a channel, channel path display server 150 may display user interface 700, which may include a variety of information associated with the channel path selected by the user. User interface 700 may display an entire channel path of the selected channel, one or more portions of the channel path, etc. User interface 700 may display equipment (e.g., a representation of equipment) associated with the selected channel path. In another implementation, user interface 700 may include left/right scrolling mechanism 750 (e.g., a scroll bar) that enables a user to scroll left and/or right through the channel path displayed by user interface 700, and/or up/down scrolling mechanism 755 (e.g., a scroll bar) that enables a user to scroll up and down through the channel path displayed by user interface 700.

Returning to FIG. 11, the user may be enabled to zoom in and/or out on the associated equipment to display connection details of the associated equipment (block 1120). For example, in one implementation described above in connection with FIGS. 7 and 8, if selected by a user (e.g., via a mouse or similar selection mechanism), zoom in button 760 may enable the user to zoom in on the channel path (or a portion of the channel path) displayed by user interface 700 (e.g., via zoom selector mechanism 775). A user may use zoom selector mechanism 775 to highlight one or more portions (e.g., as indicated by dashed box 840) of the selected channel path displayed by user interface 800. The highlighted one or more portions may be displayed (e.g., by channel path display server 150) in an enlarged view so that detail information (e.g., connection details, status, port level details, etc. of the displayed equipment) may be displayed.

Implementations described herein may include systems and/or methods that manage and/or display channel paths through equipment of a video network. For example, in one implementation, the systems and/or methods may receive a selected channel of the video network, and/or may determine equipment associated with the selected channel. The systems and/or methods may determine status information and/or port level details for the associated equipment, and/or may combine the information into a path for the selected channel. The systems and/or methods may display the information associated with the selected channel path. In other implementations, the systems and/or methods may enable a user to scroll through the selected channel path and/or its associated equipment, and/or may enable a user to zoom on the associated equipment for display of connection details.

The foregoing description of implementations provides illustration and description, but is not intended to be exhaustive or to limit the invention to the precise form disclosed. Modifications and variations are possible in light of the above teachings or may be acquired from practice of the invention.

For example, while a series of acts has been described with regard to FIGS. 9-11, the order of the acts may be modified in other implementations. Further, non-dependent acts may be performed in parallel.

Also, the term "user" has been used herein, and is intended to be broadly interpreted to include a channel path display server (e.g., channel path display server 150) or a user of a channel path display server.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that one would be able to design software and control hardware to implement the embodiments based on the description herein.

Further, certain portions of the invention may be implemented as "logic" that performs one or more functions. This logic may include hardware, such as an application specific integrated circuit or a field programmable gate array, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    receiving, by a computer device and from a user, a selection of a channel provided by a video network;
    determining, by the computer device, network devices, of the video network, that are associated with the selected channel,
        at least one of the network devices not being associated with another channel provided by the video network, the other channel being different from the selected channel;
    determining, by the computer device, status information of the network devices,
        the status information including information identifying one or more ports, in each of the network devices, associated with the selected channel;
    identifying, by the computer device and based on the status information, a path in the video network for the selected channel,
        the path including the network devices; and
    providing, for display and by the computer device, information regarding the path to the user.

2. The method of claim 1, where providing, for display, the information regarding the path includes:
    providing, for display, data associated with the status information.

3. The method of claim 2, where providing, for display, the data associated with the status information includes:
    providing, for display, a visual indication of the one or more ports, in each of the network devices, associated with the selected channel.

4. The method of claim 2, where providing, for display, the data associated with the status information includes:
    providing, for display, a visual indication of at least one different port, in one of the network devices, that is not associated with the selected channel.

5. The method of claim 1, where providing, for display, the information regarding the path includes:
    providing, for display, data identifying the network devices.

6. The method of claim 1, where the path includes one or more interconnections between each of the network devices, and
    where providing, for display, the information regarding the path includes:
        providing a visual indication of the one or more interconnections.

7. The method of claim 1, where providing, for display, the information regarding the path includes:
    providing, for display, an indication of a signal flow, associated with the selected channel, between the network devices.

8. The method of claim 1, where providing the path for display includes:
    providing, for display, a visual identification that another network device, in the video network, is not associated with the selected channel.

9. A memory device storing instructions, the instructions comprising:
    one or more instructions that, when executed by a processor of a computer device, cause the processor to:

identify one or more devices, of a plurality of devices in a video network, associated with a channel;
identify one or more interconnections, between the one or more devices and associated with the channel;
determine status information associated with the one or more devices and the one or more interconnections; and
provide, for display, data associated with the one or more devices, data associated with the one or more interconnections, and the status information.

10. The memory device of claim 9, where the status information includes information identifying one or more ports, in the one or more devices coupled to the one or more interconnections, and
where the one or more instructions to provide, for display, the data associated with the one or more devices, the data associated with the one or more interconnections, and the status information include:
one or more instructions to provide, for display, data identifying the one or more ports.

11. The memory device of claim 10, where the one or more instructions to provide, for display, the data associated with the one or more devices, the data associated with the one or more interconnections, and the status information further include:
one or more instructions to provide, for display, data identifying at least one port, in the one or more devices, that is not associated with the channel.

12. The memory device of claim 9, where the one or more instructions to provide, for display, the data associated with the one or more devices, the data associated with the one or more interconnections, and the status information further include:
one or more instructions to provide, for display, data identifying the one or more devices.

13. The memory device of claim 9, where the one or more instructions to provide, for display, the data associated with the one or more devices, the data associated with the one or more interconnections, and the status information further include:
one or more instructions to provide, for display, an indication of a signal flow, associated with the channel, between the one or more devices.

14. The memory device of claim 9, where the one or more instructions to provide, for display, the data associated with the one or more devices, data associated with the one or more interconnections, and the status information further include:
one or more instructions to provide, for display, a visual identification that another device, in the video network, is not associated with the channel.

15. A device comprising:
a processor to:
receive a selection of a channel provided by a video network,
determine a path associated with the selected channel, the path including equipment of the video network and interconnections connecting the equipment,
determine status information associated with the equipment and the interconnections, and
provide a visual indication of the path and the status information.

16. The device of claim 15, where the processor is further to:
identify port level information associated with the equipment and the interconnections, and
provide a visual indication of the port level information.

17. The device of claim 16, where the processor, when providing the visual indication of the port level information, is further to:
provide a visual indication of one or more ports, in the equipment, associated with the channel.

18. The device of claim 15, where the video network comprises a television network, and
where the equipment includes one or more of:
a super head end (SHE),
a video hub office (VHO), or
a video service office (VSO).

19. The device of claim 15, where the processor is further to:
determine another path associated with another channel, where the other path is different from the path, and
where the other channel is different from the channel, and
provide a visual indication of the other path, including visually distinguishing the path and the other path.

20. The device of claim 15, where the processor is further to:
receive updated status information associated with the equipment and the interconnections, and
modify the visual indication based on the updated status information.

* * * * *